United States Patent
Ye

(10) Patent No.: US 9,443,279 B2
(45) Date of Patent: Sep. 13, 2016

(54) DIRECT LINK SYNCHRONIZATION COMMUNICATION BETWEEN CO-PROCESSORS

(75) Inventor: Minjiao Ye, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 284 days.

(21) Appl. No.: 13/977,467

(22) PCT Filed: Dec. 26, 2011

(86) PCT No.: PCT/CN2011/084634
§ 371 (c)(1),
(2), (4) Date: Sep. 17, 2013

(87) PCT Pub. No.: WO2013/097071
PCT Pub. Date: Jul. 4, 2013

(65) Prior Publication Data
US 2014/0204099 A1    Jul. 24, 2014

(51) Int. Cl.
| | |
|---|---|
| *G09G 5/393* | (2006.01) |
| *G06T 1/20* | (2006.01) |
| *G09G 5/12* | (2006.01) |
| *H04N 21/426* | (2011.01) |
| *G06F 3/14* | (2006.01) |
| *G09G 5/36* | (2006.01) |
| *G06T 1/60* | (2006.01) |
| *G09G 5/00* | (2006.01) |
| *G09G 5/18* | (2006.01) |

(52) U.S. Cl.
CPC . *G06T 1/20* (2013.01); *G06F 3/14* (2013.01); *G06T 1/60* (2013.01); *G09G 5/001* (2013.01); *G09G 5/12* (2013.01); *G09G 5/363* (2013.01); *H04N 21/42653* (2013.01); *G09G 5/18* (2013.01); *G09G 5/393* (2013.01); *G09G 2360/06* (2013.01); *G09G 2360/127* (2013.01)

(58) Field of Classification Search
None
See application file for complete search history.

(56) References Cited

U.S. PATENT DOCUMENTS

| | | | |
|---|---|---|---|
| 6,480,200 B1 * | 11/2002 | Fisher | G06T 1/60 345/552 |
| 7,522,167 B1 | 4/2009 | Diard et al. | |
| 2006/0082580 A1 * | 4/2006 | Chow | G06F 3/14 345/501 |
| 2006/0132491 A1 * | 6/2006 | Riach | G06T 15/005 345/505 |
| 2011/0148890 A1 | 6/2011 | Kaburlasos et al. | |

FOREIGN PATENT DOCUMENTS

| | | |
|---|---|---|
| CN | 101080698 A | 11/2007 |
| WO | 2004/097789 A1 | 11/2004 |

(Continued)

OTHER PUBLICATIONS

Lee, Kangmin, et al. "Networks-on-chip and networks-in-package for high-performance SoC platforms." Asian Solid-State Circuits Conference, 2005. IEEE, 2005.*

(Continued)

*Primary Examiner* — Ulka Chauhan
*Assistant Examiner* — Schiller Hill

(57) ABSTRACT

Systems, apparatus, articles, and methods are described including operations to communicate synchronization notifications between a co-processor graphic data producer and a co-processor graphic data consumer via a direct link without passing such communications through the central processing unit.

26 Claims, 5 Drawing Sheets

(56) References Cited

FOREIGN PATENT DOCUMENTS

WO     2004097789   A1    11/2004
WO     2013/097071   A1    7/2013

OTHER PUBLICATIONS

International Search Report and Written opinion for PCT Patent Application No. PCT/CN2011/084634, mailed on Sep. 27, 2012, 9 Pages.

European Search Report for European Patent Application No. EP 11 87 8758, mailed Aug. 20, 2015, 7 pages.

Kangmin Lee, et al., "Networks-on-chip and Networks-in-Package for High-Performance SOC Platforms", Asian Solid-State Conference, 2005. IEEE, 2005.

Office Action for Chinese Patent Application No. 201180075946.9, mailed Mar. 25, 2016, 8 pages.

Official Letter and Search Report for Taiwan Patent Application No. 101149810, mailed Jun. 24, 2016, 8 pages.

\* cited by examiner

DIRECT LINK SYNCHRONIZATION COMMUNICATION BETWEEN CO-PROCESSORS

BACKGROUND

In current system-on-chip (SoC) processors, there are many applications that utilize cooperation between different processing cores. For example, such cooperation may be between a three dimensional (3D) engine of a graphics core and a WiFi component.

Such cooperation often consists of data transmission messages and/or synchronization messages. For data transmission messages, such messaging may be done by DMA (Direct Memory Access) or memory mapping. For synchronization messages, such messages may typically be handled by the central processing unit (CPU).

Currently, some users may still be suffering from the tearing of a screen when they watch a video or play games. In general, such tearing may be happening when a display controller scans the buffer when the buffer is being updated at the same time. These conflicts of the read and write on the buffer, will produce the tearing. When the users are playing the games or watching the video, the screen is updated frequently; it is highly possible that the display controller will conflict with the update of buffer and introduce the tearing.

For the tearing issue produced by the conflict of the display controller scanning and the write to the buffer, one solution is to use flip method. In such a flip method, new screen content may be written to a back buffer first. Then, when the display controller finishes the scanning of active area and after a vertical blanking interval (VBLANK) interrupt is received, the system may flip the back buffer with front buffer.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
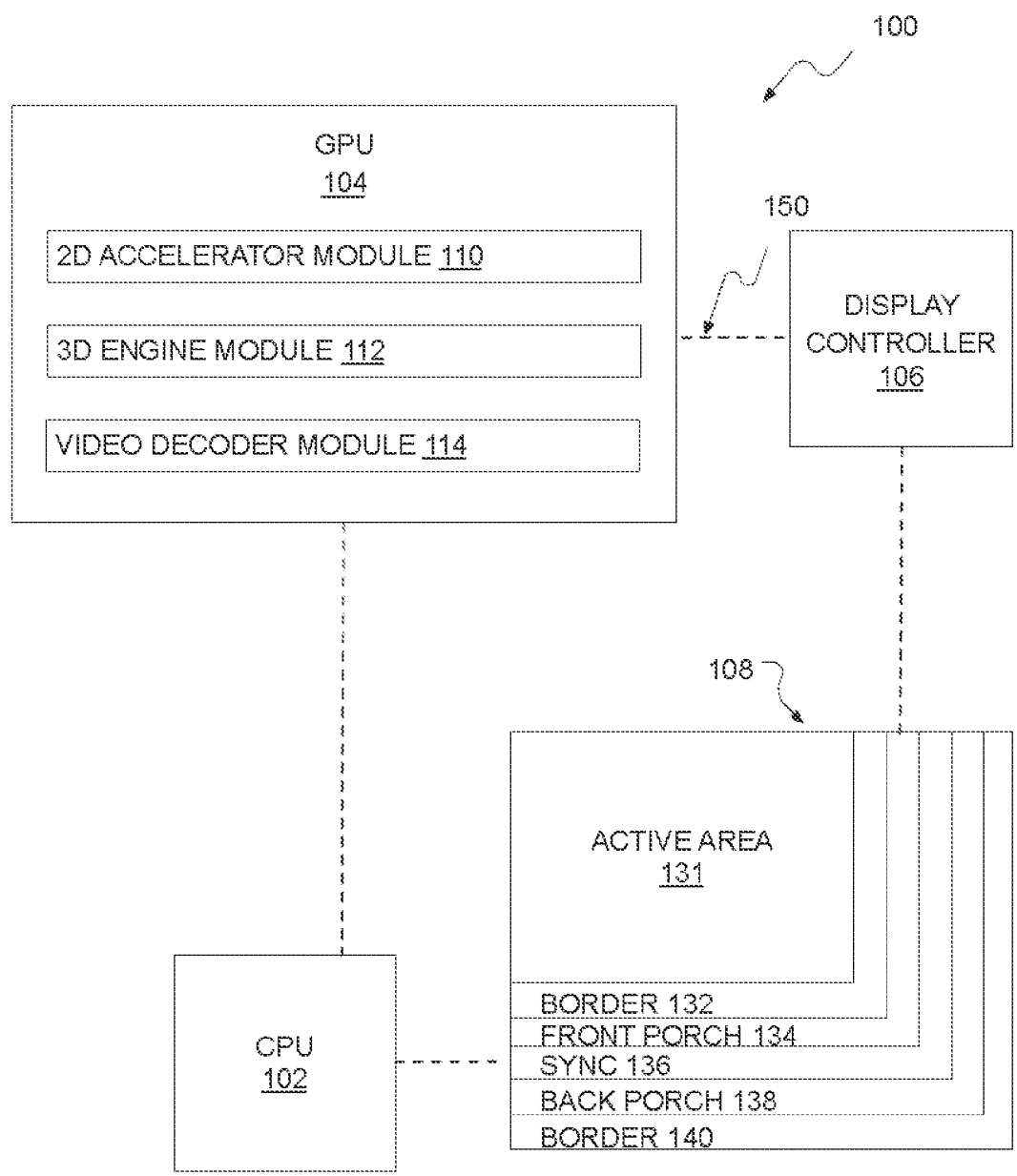
FIG. 1 is an illustrative diagram of an example an graphics processing system.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to effect such feature, structure, or characteristic in connection with other implementations whether or not explicitly described herein.

As will be described in greater detail below, some example implementation may include operations to communicate synchronization notifications between a co-processor graphic data producer and a co-processor graphic data consumer via a direct link without passing such communications through the central processing unit.

FIG. 1 is an illustrative diagram of a graphics processing system 100, arranged in accordance with at least some implementations of the present disclosure. In the illustrated implementation, graphics processing system 100 may include a central processing unit (CPU) 102, a graphics processing unit (GPU) 104, a display controller 106, and/or a buffer 108. In some examples, graphics processing system 100 may include additional items that have not been shown in FIG. 1 for the sake of clarity. For example, graphics processing system 100 may include a radio frequency-type (RF) transceiver, and/or an antenna. Further, IVI system 100 may include additional items such as a speaker, a display, an accelerometer, memory, a router, network interface logic, etc. that have not been shown in FIG. 1 for the sake of clarity.

In operation, GPU 104 may be configured to transfer image data to buffer 108. Similarly, display controller 106 may be configured to scan image data from buffer 108.

In the illustrated implementation, GPU 104 may include a two dimensional (2D) accelerator module 110, a three dimensional (3D) engine module 112, a video decoder module 114, the like, and/or combinations thereof. In some implementations, 2D accelerator module 110, 3D engine module 112, and/or video decoder module 114 may be described herein as examples of a co-processor graphic data producer. As used herein, the term "co-processor graphic data producer" may refer to a non-CPU processor configured to generate image data for use by a co-processor graphic data consumer.

In some implementations, display controller 106 and/or a wireless display (WiDi) module (not shown) may be described herein as examples of a co-processor graphic data consumer. As used herein, the term "co-processor graphic data consumer" may refer to a non-CPU processor configured to utilize image data from a co-processor graphic data producer.

In some implementations, CPU 102, the co-processor graphic data producer (e.g., all or portions of GPU 104 including 2D accelerator module 110, 3D engine module 112, and/or video decoder module 114), and the co-processor graphic data consumer (e.g., display controller 106 and/or WiDi) all may form part of a system-on-chip (SoC) processor. However, this is merely an example implementation, and CPU 102, GPU 104, and/or display controller 106 may be implemented in a non-SoC manner.

In some examples, a module may be configured to operate as both a co-processor graphic data consumer and a co-processor graphic data producer, depending on the particular stag of operation. For example, 3D engine module 112 may operate as a co-processor graphic data consumer when scanning image data generated from video decoder module-type 114 co-processor graphic data producer.

In one example, the co-processor graphic data producer may include 3D engine module 112 and the co-processor graphic data consumer may include display controller 106. In another example, the co-processor graphic data producer may include video decoder module and the co-processor graphic data consumer may include display controller 106. In a further example, the co-processor graphic data producer may include 2D accelerator module and the co-processor graphic data consumer may include display controller 106.

In implementations where the co-processor graphic data consumer may include a WiDi module, such a WiDi module may wirelessly communicate such image information to a wireless display, where display controller 106 may ultimately receive such image information. In such implementations, the co-processor graphic data producer may include a two dimensional (2D) accelerator module 110, a three dimensional (3D) engine module 112, a video decoder module 114, the like, and/or combinations thereof.

In the illustrated implementation, buffer 108, when in operation, may include an active area 131 portion, a border 132 portion, a front porch 134 portion, a synch 136 portion, a back porch 138 portions, and/or a border 140 portion. As used herein, the term "buffer" may refer to one or more of the following buffer types: a frame buffer, a render buffer, a front buffer, a back buffer, the like, and/or combinations thereof.

In some examples, display controller 106 may scan buffer 108 line by line. Further, display controller 106 may be configured to send an interrupt message to GPU 104 (e.g., 3D engine module 112). When display controller 106 finishes the scanning of the active area 131, display controller 106 may produce an interrupt message to 3D engine module 112. In some examples, such an interrupt message may be a vertical blanking interval (VBLANK) interrupt. For example, such a VBLANK interrupt may occur after front porch 134 portion of the operation of buffer 108.

After the VBLANK interrupt, there may be an interval before display controller 106 will scan active area 131 again. 3D engine module 112 may first transfer the latest screen image data to a back buffer (not shown, with an address A) portion of buffer 108. When the VBLANK interrupt is triggered and received by GPU 104, GPU 104 may notify display controller 106 with a message including address A (e.g., a pointer), that the back buffer is ready for scanning. Thereafter, display controller 106 may treat the back buffer as the next active area and scan it (e.g., performing flipping). In other words, the pointer to the back buffer may be stored in display controller 106, though updated by the GPU 104 (e.g., directly updated by writing a register in display controller 106, or indirectly by just sending the message to display controller 106 via direct link 150).

In operation, synchronization messages may be communicated directly between the co-processor graphic data producer (e.g., 2D accelerator module 110, 3D engine module 112, and/or video decoder module 114) and the co-processor graphic data consumer (e.g., display controller 106 and/or WiDi) via a direct link 150. In some examples, direct link 150 may include one or more direct wire connections (e.g., direct wire connections in the chip) between the co-processor graphic data producer and the co-processor graphic data consumer. In other examples, direct link 150 may include one or more routes in a network-on-chip (NoC) between the co-processor graphic data producer and the co-processor graphic data consumer. For example, a VBLANK interrupt may be communicated between display controller 106 and 3D engine module 112 without involving CPU 102.

Additionally or alternatively, communications between CPU 102 and the co-processor graphic data producer (e.g., 2D accelerator module 110, 3D engine module 112, and/or video decoder module 114) or between CPU 102 and the co-processor graphic data consumer (e.g., display controller 106 and/or WiDi) may be performed via a direct memory access-type data transmission (DMA) or a memory mapping-type data transmission.

In a typical 3D application display scenario, if a 3D application is run, the 3D output may bed be first rendered to the frame buffer 108 by 3D engine module 112, and afterwards display controller 106 may read from frame buffer 108 and send the data to the screen (not shown) and eventually display it. When display controller 106 is reading from frame buffer 108, 3D engine module 112 may not write to frame buffer 108; otherwise display controller 106 may read a broken image, resulting in screen tearing.

Instead of handling the synchronization between 3D engine module 112 and display controller 106 by CPU 102, display controller may notify 3D engine 112 that display controller 106 has just finished reading the last frame, and it's safe to render another frame to buffer 108 now. In this way, coordination by CPU 102 between display controller 106 and 3D engine module 112 may be avoided as 3D engine module 112 and display controller 106 may simply talk to each other via direct link 150 (e.g., a direct signal connection).

Similar implementations may be utilized for other scenarios like Wireless Display (WiDi), video playback, etc. For example, with WiDi, the wireless module (not shown) may read data from frame buffer 108, and 3D engine module 112 (or 2D accelerator 110, video decoder module 114, etc.) may write to frame buffer 108. In this way, coordination by CPU 102 between the wireless module and 3D engine module 112 may be avoided as 3D engine module 112 and the wireless module may simply talk to each other via direct link 150 (e.g., a direct signal connection) so that the wireless module will not read a broken frame and send it to a remote display screen.

In another implementation, video playback may involve video decoder module 114 (e.g. the MSVDX core of PowerVR), 3D engine module 112, and/or display controller 106. In such an example, video decoder module 114 may render the decoded frame to a buffer (usually in YUV format), which is then read by 3D engine 112 and rendered to frame buffer 108 as a texture (e.g., in RGB format), and eventually display controller 106 may read from frame buffer 108 and send the data to the screen. The coordination between these three co-processing cores may be handled via a first direct link 150 between video decoder module 114 and 3D engine module 112 and a second direct link 150 between 3D engine module 112 and display controller 106. In such an example, 3D engine module 112 may operate as a co-processor graphic data consumer when scanning image data generated from video decoder module-type 114 co-processor graphic data producer, and may operate as a co-processor graphic data producer when rendering to frame buffer 108.

When inter-core coordination goes through CPU 102, it may possibly make CPU 102 quite busy. For example, since a VSYNC signal of display controller 106 comes about sixty times every second, such signal may stop CPU 102 from entering a low power state. Further, if CPU 102 is busy, inter-core coordination via CPU 102 may compromise overall performance even though the co-processing cores are not busy. For example, the video playback may interfere with the wireless module even if two applications mainly use separate co-processing cores in cases where the inter-core coordination goes through CPU 102.

In addition to utilizing direct links 150 between co-processing cores to facilitate the inter-core synchronization, the cooperating co-processing cores may be configured to act according to some protocols. Such protocols may be configured to take such direct communication into account. Some example protocols are discussed in greater detail below with regard to FIG. 3. Additionally or alternatively, some extra (but relatively minimal) logic may be added to the co-processing cores to handle such coordination protocols. Such extra logic added to each co-processing cores for synchronization protocol handling may change the behavior of the existing co-processing cores. For example, such logic may hold on 3D engine module 112 writing until receiving the VSYNC signal from display controller 106.

Figure 2:
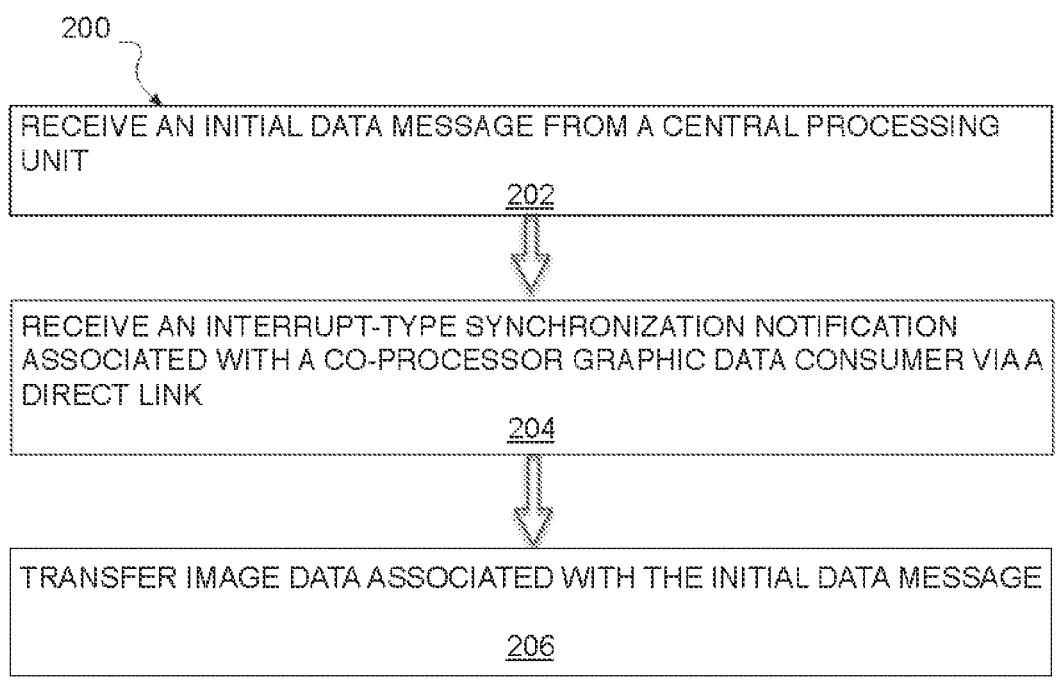
FIG. 2 is a flow chart illustrating an example synchronization process.

FIG. 2 is a flow chart illustrating an example synchronization process 200, arranged in accordance with at least some implementations of the present disclosure. In the illustrated implementation, process 200 may include one or more operations, functions or actions as illustrated by one or more of blocks 202, 204, and/or 206. By way of non-limiting example, process 200 will be described herein with reference to example graphics processing system 100 of FIG. 1.

Process 200 may begin at block 202, "RECEIVE AN INITIAL DATA MESSAGE FROM A CENTRAL PROCESSING UNIT", where an initial data message may be received from a central processing unit. For example, the initial data message may be received from the central processing unit via a co-processor graphic data producer.

Processing may continue from operation 202 to operation 204, "RECEIVE AN INTERRUPT-TYPE SYNCHRONIZATION NOTIFICATION ASSOCIATED WITH A CO-PROCESSOR GRAPHIC DATA CONSUMER VIA A DIRECT LINK", where an interrupt-type synchronization notification may be received. For example, interrupt-type synchronization notification may be received, via the co-processor graphic data producer, from the co-processor graphic data consumer.

In some examples, the communication of the interrupt-type synchronization notification between the co-processor graphic data producer and the co-processor graphic data consumer may be made via a direct link. For example, the co-processor graphic data producer may receive the interrupt-type synchronization notification from the co-processor graphic data consumer via the direct link without passing such communications through the central processing unit.

Processing may continue from operation 204 to operation 206, "TRANSFER IMAGE DATA ASSOCIATED WITH THE INITIAL DATA MESSAGE", where image data associated with the initial data message may be transferred. For example, the image data associated with the initial data message may be transferred, via the co-processor graphic data producer, to a buffer. Such a transfer may occur in response to the interrupt-type synchronization notification.

Some additional and/or alternative details related to process 200 may be illustrated in one or more examples of implementations discussed in greater detail below with regard to FIG. 3.

Figure 3:
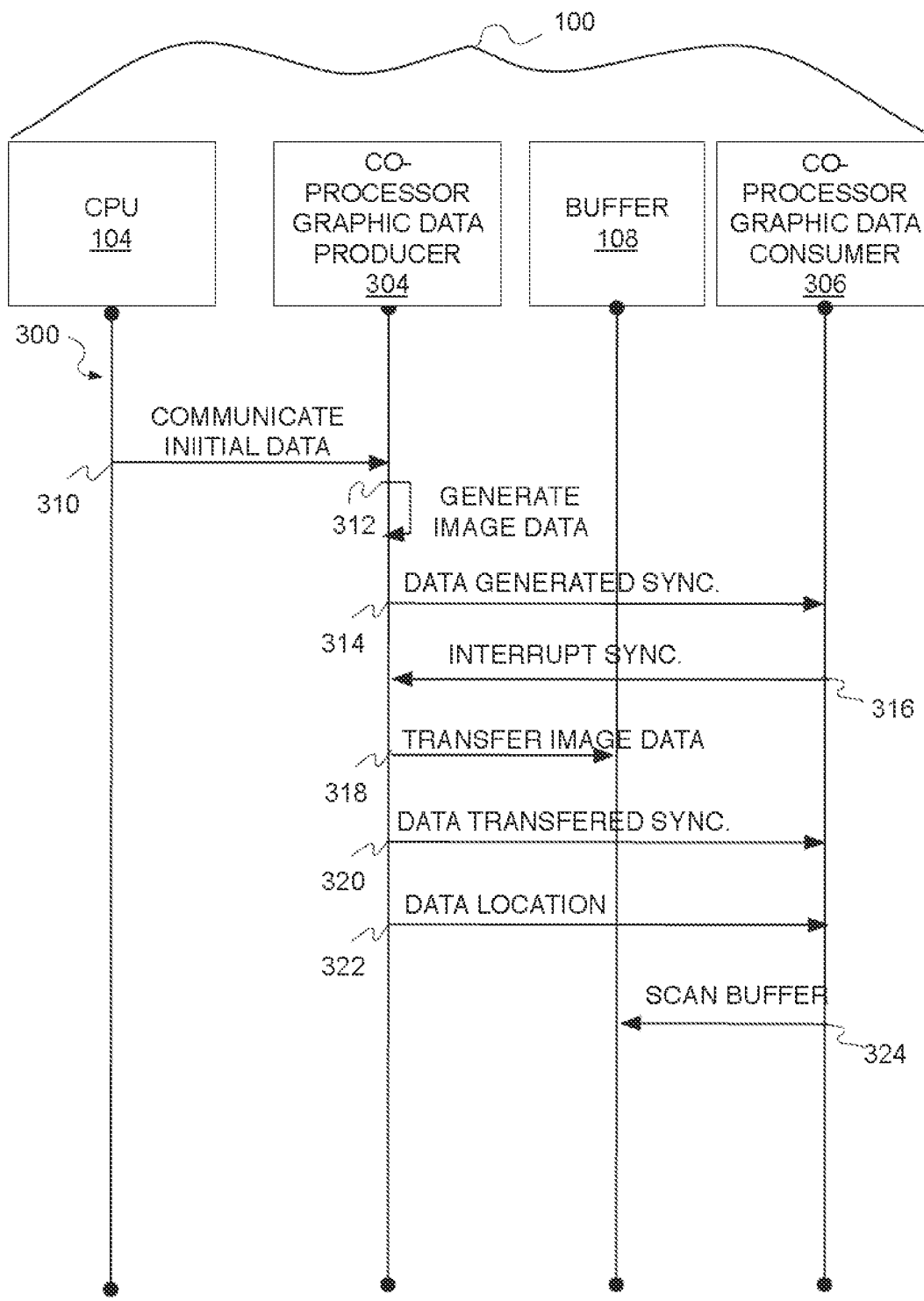
FIG. 3 is an illustrative diagram of an example graphics processing system in operation.

FIG. 3 is an illustrative diagram of example graphics processing system 100 and synchronization process 300 in operation, arranged in accordance with at least some implementations of the present disclosure. In the illustrated implementation, process 300 may include one or more operations, functions or actions as illustrated by one or more of actions 310, 312, 314, 316, 318, 320, 322, and/or 324. By way of non-limiting example, process 300 will be described herein with reference to example graphics processing system 100 of FIG. 1.

In the illustrated implementation, graphics processing system 100 may include CPU 102, co-processor graphic data producer 304, co-processor graphic data consumer 306, and/or buffer 108. Additionally, buffer 108 may include a back buffer and/or a front buffer (not shown). As illustrated, CPU 102, the co-processor graphic data producer 304, the co-processor graphic data consumer 306, and/or buffer 108 may be capable of communication with one another. Although graphics processing system 100, as shown in FIG. 3, may include one particular set of blocks or actions associated with particular modules, these blocks or actions may be associated with different modules than the particular module illustrated here.

Process 300 may begin at block 310, "COMMUNICATE INITIAL DATA", where initial data may be communicated. For example, the initial data message may be received from CPU 102 via co-processor graphic data producer 304.

Processing may continue from operation 310 to operation 312, "GENERATE IMAGE DATA", where image data may be generated. For example, co-processor graphic data producer 304 may generate image data in response to the initial data message from CPU 102.

Processing may continue from operation 312 to operation 314, "DATA GENERATED SYNC.", where a data generated-type synchronization notification may be communicated. For example, the data generated-type synchronization notification may be communicated, via co-processor graphic data producer 304, co-processor graphic data consumer 306. In some examples, the data generated-type synchronization notification may be communicated in response to the image data having been generated.

Processing may continue from operation 314 to operation 316, "INTERRUPT SYNC.", where an interrupt-type synchronization notification may be received. For example, interrupt-type synchronization notification may be received, via co-processor graphic data producer 304, from co-processor graphic data consumer 306.

For example, the interrupt may be communicated, via display controller 106, to CPU 102. In some examples, the interrupt may be communicated based at least in part on the determination that buffer 108 at an appropriate point to send the interrupt. For example, co-processor graphic data consumer 306 may determine that scanning of buffer 108 is at a suitable point for sending the interrupt.

Processing may continue from operation 316 to operation 318, "TRANSFER IMAGE DATA", where image data associated with the initial data message may be transferred. For example, the image data associated with the initial data message may be transferred, via co-processor graphic data producer 304, to buffer 108. Such a transfer may occur in response to the interrupt-type synchronization notification.

In some implementations, image data may be transferred to buffer 108 when buffer 108 is at an appropriate the interrupt point (see, e.g., after front porch 134 portion of the operation of buffer 108 in FIG. 1).

Processing may continue from operation 318 to operation 320, "DATA TRANSFERRED SYNC.", where a data transferred-type synchronization notification may be communicated. For example, data transferred-type synchronization notification may be communicated, via co-processor graphic data producer 304, to co-processor graphic data consumer 306. In some examples, data transferred-type synchronization notification may be communicated in response to the transfer of the image data having ceased.

Processing may continue from operation 320 to operation 322, "DATA LOCATION", where a location notification may be communicated. For example, the location notification may be communicated, via co-processor graphic data producer 304, to co-processor graphic data consumer 306. In some examples, the location notification may be communicated in response to the transfer of the image data having ceased. Such a location notification may indicate the buffer location where the image data has been transferred to. In some examples, the location notification may be combined with the data transferred-type synchronization notification of operation 320.

Processing may continue from operation 322 to operation 324, "SCAN BUFFER", where buffer 108 may be scanned. For example, image data from may be scanned from buffer 108 via co-processor graphic data consumer 306. In some implementations, buffer 108 may be scanned via co-processor graphic data consumer 306 when co-processor graphic data producer 304 is not writing to buffer 108. For example, buffer 108 may be scanned via co-processor graphic data consumer 306 in response to the data transferred-type synchronization notification and/or the location notification.

In operation, process 300 and/or process 200 may operate so that the data generated-type synchronization notification, interrupt-type synchronization notification, data transferred-type synchronization notification, the location notification, and/or the like may be communicated between co-processor graphic data producer 304 and co-processor graphic data consumer 306 via the direct link (see, e.g., direct link 150 of FIG. 1) without passing such communications through CPU 102.

In an example implementation where co-processor graphic data producer 304 is a 3D engine and co-processor graphic data consumer 306 is a display controller, the 3D engine may only be allowed to update a frame-type buffer 108 during the VBlank period. In such an example, instead of CPU 012 notifying the 3D engine of the VSYNC signal, the VSYNC signal may be directly communicated to the 3D engine from the display controller by direct inter-core synchronization. Such direct inter-core synchronization may bypass CPU 102 and may allow other co-processing cores 304 and 306 to coordinate each other directly. For example, with the direct signal connections and synchronization protocols, co-processing cores 304 and 306 may cooperate to process some data and finish some tasks efficiently while bypassing CPU 102.

In the example implementation where co-processor graphic data producer 304 is a 3D engine and co-processor graphic data consumer 306 is a display controller, there may be a wire-type direct link (e.g., signal connection) between the 3D engine and the display controller. Via this direct link, some signals could be initiated by one co-processing core 304 and received by another co-processing core 306 while bypassing CPU 102. For example, the display controller could send the VSYNC signal to the 3D engine via such a direct link bypassing CPU 102.

As the CPU may be bypassed, co-processor graphic data producer 304 and co-processor graphic data consumer 306 may have defined synchronization protocols. Upon receiving the synchronization communications, the co-processing cores 304/306 may take action according to such defined synchronization protocols. For example, between the display controller and the 3D engine, one protocol may be: "buffer image data on receiving the VSYNC signal; otherwise the 3D engine should hold on and do not touch the frame buffer".

In the 3D engine and display controller example, added circuit logic may only enable the writing function of the 3D engine upon receiving the VSYNC signal from the display controller, which may only utilize less than a dozen of transistors. For some co-processing cores (e.g. the SGX core of PowerVR), such co-processing cores may nm programs or even some simple operating systems (e.g., micro-kernel); therefore such inter-core coordination protocols may be handled with or without any extra circuit logic.

While implementation of example processes 200 and 300, as illustrated in FIGS. 2 and 3, may include the undertaking of all blocks shown in the order illustrated, the present disclosure is not limited in this regard and, in various examples, implementation of processes 200 and 300 may include the undertaking only a subset of the blocks shown and/or in a different order than illustrated.

In addition, any one or more of the blocks of FIGS. 2 and 3 may be undertaken in response to instructions provided by one or more computer program products. Such program products may include signal bearing media providing instructions that, when executed by, for example, a processor, may provide the functionality described herein. The computer program products may be provided in any form of computer readable medium. Thus, for example, a processor including one or more processor core(s) may undertake one or more of the blocks shown in FIGS. 4 and 5 in response to instructions conveyed to the processor by a computer readable medium.

As used in any implementation described herein, the term "module" refers to any combination of software, firmware and/or hardware configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 4:
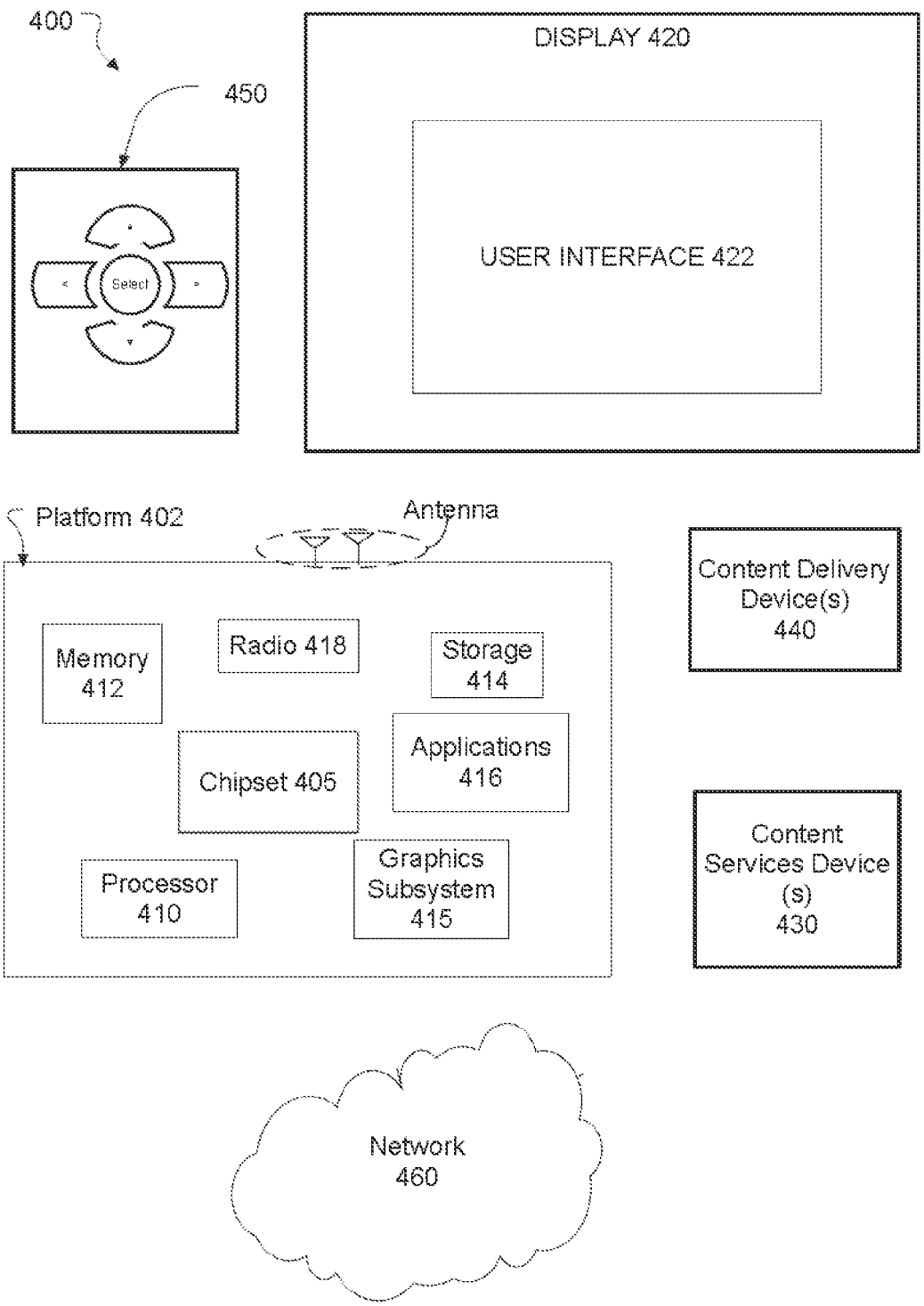
FIG. 4 is an illustrative diagram of an example system.

FIG. 4 illustrates an example system 400 in accordance with the present disclosure. In various implementations, system 400 may be a media system although system 400 is not limited to this context. For example, system 400 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 400 includes a platform 402 coupled to a display 420. Platform 402 may receive content from a content device such as content services device(s) 430 or content delivery device(s) 440 or other similar content sources. A navigation controller 450 including one or more navigation features may be used to interact with, for example, platform 402 and/or display 420. Each of these components is described in greater detail below.

In various implementations, platform 402 may include any combination of a chipset 405, processor 410, memory 412, storage 414, graphics subsystem 415, applications 416 and/or radio 418. Chipset 405 may provide intercommunication among processor 410, memory 412, storage 414, graphics subsystem 415, applications 416 and/or radio 418. For example, chipset 405 may include a storage adapter (not depicted) capable of providing intercommunication with storage 414.

Processor 410 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 410 may be dual-core processor(s), dual-core mobile processor(s), and so forth.

Memory 412 may be implemented as a volatile memory device such as, but not limited to, a Random Access Memory (RAM), Dynamic Random Access Memory (DRAM), or Static RAM (SRAM).

Storage 414 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 414 may include technology to increase the storage performance enhanced protection for valuable digital media when multiple hard drives are included, for example.

Graphics subsystem 415 may perform processing of images such as still or video for display. Graphics subsystem 415 may be a graphics processing unit (GPU) or a visual processing unit (VPU), for example. An analog or digital interface may be used to communicatively couple graphics subsystem 415 and display 420. For example, the interface may be any of a High-Definition Multimedia Interface, DisplayPort, wireless HDMI, and/or wireless HD compliant techniques. Graphics subsystem 415 may be integrated into processor 410 or chipset 405. In some implementations, graphics subsystem 415 may be a stand-alone card communicatively coupled to chipset 405.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 418 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 418 may operate in accordance with one or more applicable standards in any version.

In various implementations, display 420 may include any television type monitor or display. Display 420 may include, for example, a computer display screen, touch screen display, video monitor, television-like device, and/or a television. Display 420 may be digital and/or analog. In various implementations, display 420 may be a holographic display. Also, display 420 may be a transparent surface that may receive a visual projection. Such projections may convey various forms of information, images, and/or objects. For example, such projections may be a visual overlay for a mobile augmented reality (MAR) application. Under the control of one or more software applications 416, platform 402 may display user interface 422 on display 420.

In various implementations, content services device(s) 430 may be hosted by any national, international and/or independent service and thus accessible to platform 402 via the Internet, for example. Content services device(s) 430 may be coupled to platform 402 and/or to display 420. Platform 402 and/or content services device(s) 430 may be coupled to a network 460 to communicate (e.g., send and/or receive) media information to and from network 460. Content delivery device(s) 440 also may be coupled to platform 402 and/or to display 420.

In various implementations, content services device(s) 430 may include a cable television box, personal computer, network, telephone, Internet enabled devices or appliance capable of delivering digital information and/or content, and any other similar device capable of unidirectionally or bidirectionally communicating content between content providers and platform 402 and/display 420, via network 460 or directly. It will be appreciated that the content may be communicated unidirectionally and/or bidirectionally to and from any one of the components in system 400 and a content provider via network 460. Examples of content may include any media information including, for example, video, music, medical and gaming information, and so forth.

Content services device(s) 430 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 402 may receive control signals from navigation controller 450 having one or more navigation features. The navigation features of controller 450 may be used to interact with user interface 422, for example. In embodiments, navigation controller 450 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 450 may be replicated on a display (e.g., display 420) by movements of a pointer, cursor, focus ring, or other visual indicators displayed on the display. For example, under the control of software applications 416, the navigation features located on navigation controller 450 may be mapped to virtual navigation features displayed on user interface 422, for example. In embodiments, controller 450 may not be a separate component but may be integrated into platform 402 and/or display 420. The present disclosure, however, is not limited to the elements or in the context shown or described herein.

In various implementations, drivers (not shown) may include technology to enable users to instantly turn on and off platform 402 like a television with the touch of a button after initial boot-up, when enabled, for example. Program logic may allow platform 402 to stream content to media adaptors or other content services device(s) 430 or content delivery device(s) 440 even when the platform is turned "off." In addition, chipset 405 may include hardware and/or software support for (5.1) surround sound audio and/or high definition (7.1) surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 400 may be integrated. For example, platform 402 and content services device(s) 430 may be integrated, or platform 402 and content delivery device(s) 440 may be integrated, or platform 402, content services device(s) 430, and content delivery device(s) 440 may be integrated, for example. In various embodiments, platform 402 and display 420 may be an integrated unit. Display 420 and content service device(s) 430 may be integrated, or display 420 and content delivery device(s) 440 may be integrated, for example. These examples are not meant to limit the present disclosure.

In various embodiments, system 400 may be implemented as a wireless system, a wired system, or a combination of both. When implemented as a wireless system, system 400 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 400 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 402 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 4.

Figure 5:
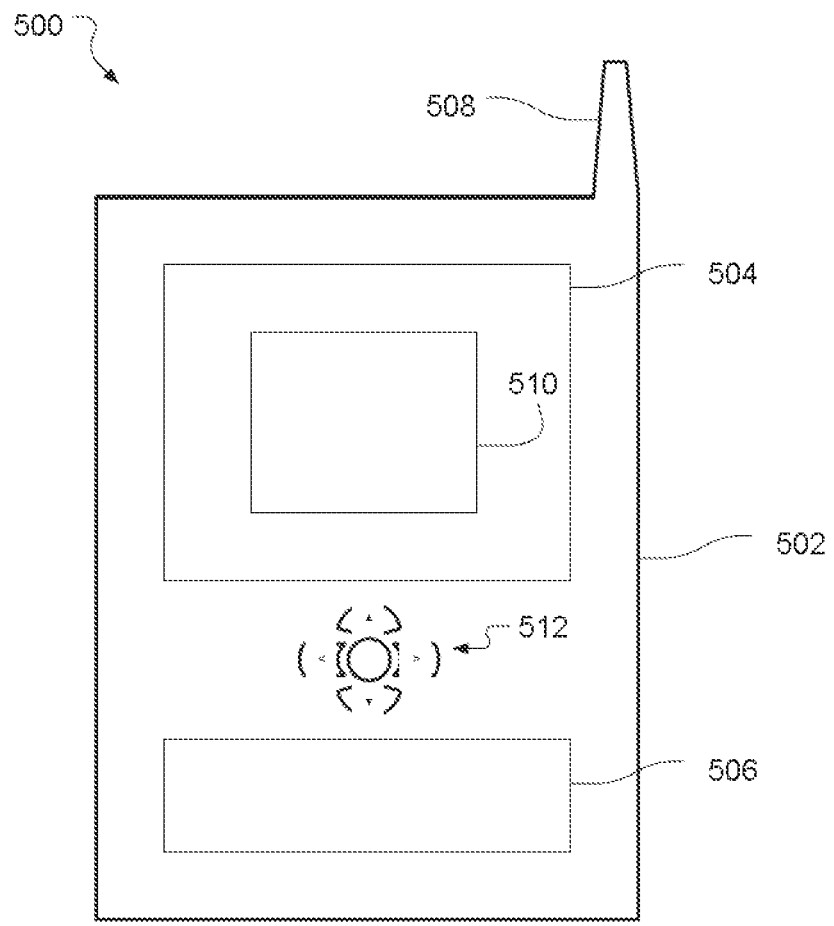
FIG. 5 is an illustrative diagram of an example system, all arranged in accordance with at least some implementations of the present disclosure.

As described above, system 400 may be embodied in varying physical styles or form factors. FIG. 5 illustrates implementations of a small form factor device 500 in which system 400 may be embodied. In embodiments, for example, device 500 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 5, device 500 may include a housing 502, a display 504, an input/output (I/O) device 506, and an antenna 508. Device 500 also may include navigation features 512. Display 504 may include any suitable display unit for displaying information appropriate for a mobile computing device. I/O device 506 may include any suitable I/O device for entering information into a mobile computing device. Examples for I/O device 506 may include an alphanumeric keyboard, a numeric keypad, a touch pad, input keys, buttons, switches, rocker switches, microphones, speakers, voice recognition device and software, and so forth. Information also may be entered into device 500 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

What is claimed:

1. A computer-implemented method, comprising:
receiving, via a co-processor graphic data producer, an initial data message from a central processing unit;
receiving, via the co-processor graphic data producer, an interrupt-type synchronization notification associated with a co-processor graphic data consumer; and
transferring, via the co-processor graphic data producer, image data associated with the initial data message to a buffer in response to the interrupt-type synchronization notification,
wherein the co-processor graphic data producer receives the interrupt-type synchronization notification from the co-processor graphic data consumer via a direct link without passing such communications through the central processing unit, wherein the direct link comprises a first direct link between a video decoder as the co-processor graphic data producer and a 3D engine module as the co-processor graphic data consumer, and a separate second direct link between the 3D engine module as the co-processor graphic data producer and a display controller as the co-processor graphic data consumer.

2. The method of claim 1, further comprising:
generating, via the co-processor graphic data producer, the image data associated with the initial data message in response to the initial data message; and
communicating, via the co-processor graphic data producer, a data generated-type synchronization notification to the co-processor graphic data consumer in response to the image data having been generated.

3. The method of claim 1, further comprising:
communicating, via the co-processor graphic data producer, a data transferred-type synchronization notification to the co-processor graphic data consumer in response to the transfer of the image data having ceased; and
communicating, via the co-processor graphic data producer, a location notification to the co-processor graphic data consumer in response to the transfer of the image data having been ceased, wherein the location notification indicates the buffer location where the image data has been transferred to.

4. The method of claim 1, further comprising:
communicating, via the co-processor graphic data producer, a data transferred-type synchronization notification to the co-processor graphic data consumer in response to the transfer of the image data having ceased; and
scanning, via the co-processor graphic data consumer, the image data from the buffer in response to the data transferred-type synchronization notification.

5. The method of claim 1, wherein the co-processor graphic data producer receives the initial data message from the central processing unit via a direct memory access-type data transmission (DMA) or a memory mapping-type data transmission.

6. The method of claim 1, wherein the direct link comprises direct wire connections between the co-processor graphic data producer and the co-processor graphic data consumer.

7. The method of claim 1, wherein the direct link comprises routes in a network-on-chip (NoC) between the co-processor graphic data producer and the co-processor graphic data consumer.

8. The method of claim 1, wherein the central processing unit, the co-processor graphic data producer, and the co-processor graphic data consumer all form part of a system-on-chip (SoC) processor.

9. The method of claim 1, wherein the co-processor graphic data producer comprises a 2D accelerator module.

10. The method of claim 1, wherein the co-processor graphic data consumer comprises a wireless display (WiDi) module.

11. The method of claim 1, wherein the buffer comprises one or more of the following buffer types: a frame buffer, a render buffer, a front buffer, and/or a back buffer.

12. The method of claim 1, further comprising:
generating, via the co-processor graphic data producer, the image data associated with the initial data message in response to the initial data message;

communicating, via the co-processor graphic data producer, a data generated-type synchronization notification to the co-processor graphic data consumer in response to the image data having been generated;

communicating, via the co-processor graphic data producer, a data transferred-type synchronization notification to the co-processor graphic data consumer in response to the transfer of the image data having ceased;

communicating, via the co-processor graphic data producer, a location notification to the co-processor graphic data consumer when the transfer of the image data has ceased, wherein the location notification indicates the buffer location where the image data has been transferred to; and scanning, via the co-processor graphic data consumer, the image data from the buffer in response to the data transferred-type synchronization notification and the location notification, wherein data generated-type synchronization notification, data transferred-type synchronization notification, and the location notification are communicated between the co-processor graphic data producer and the co-processor graphic data consumer via the direct link without passing such communications through the central processing unit, wherein the co-processor graphic data producer receives the initial data message from the central processing unit via a direct memory access-type data transmission (DMA) or a memory mapping-type data transmission, wherein the direct link comprises one or more links including a direct wire connection between the co-processor graphic data producer and the co-processor graphic data consumer or a route in a network-on-chip (NoC) between the co-processor graphic data producer and the co-processor graphic data consumer, wherein the central processing unit, the co-processor graphic data producer, and the co-processor graphic data consumer all form part of a system-on-chip (SoC) processor, wherein the co-processor graphic data producer comprises a 2D accelerator module, wherein the co-processor graphic data consumer comprises a wireless display (WiDi) module, wherein the buffer comprises one or more of the following buffer types: a frame buffer, a render buffer, a front buffer, and/or a back buffer.

13. A non-transitory article comprising a computer program product having stored therein instructions that, if executed, result in operations, comprising:

receiving, via a co-processor graphic data producer, an initial data message from a central processing unit;

receiving, via the co-processor graphic data producer, an interrupt-type synchronization notification associated with a co-processor graphic data consumer; and transferring, via the co-processor graphic data producer, image data associated with the initial data message to a buffer in response to the interrupt-type synchronization notification, wherein the co-processor graphic data producer receives the interrupt-type synchronization notification from the co-processor graphic data consumer via a direct link without passing such communications through the central processing unit, wherein the direct link comprises a first direct link between a video decoder as the co-processor graphic data producer and a 3D engine module as the co-processor graphic data consumer, and a separate second direct link between the 3D engine module as the co-processor graphic data producer and a display controller as the co-processor graphic data consumer.

14. The article of claim 13, wherein the instructions, if executed, further result in:

generating, via the co-processor graphic data producer, the image data associated with the initial data message in response to the initial data message; and communicating, via the co-processor graphic data producer, a data generated-type synchronization notification to the co-processor graphic data consumer in response to the image data having been generated.

15. The article of claim 13, wherein the instructions, if executed, further result in:

communicating, via the co-processor graphic data producer, a data transferred-type synchronization notification to the co-processor graphic data consumer in response to the transfer of the image data having ceased; and communicating, via the co-processor graphic data producer, a location notification to the co-processor graphic data consumer in response to the transfer of the image data having been ceased, wherein the location notification indicates the buffer location where the image data has been transferred to.

16. The article of claim 13, wherein the instructions, if executed, further result in:

communicating, via the co-processor graphic data producer, a data transferred-type synchronization notification to the co-processor graphic data consumer in response to the transfer of the image data having ceased; and scanning, via the co-processor graphic data consumer, the image data from the buffer in response to the data transferred-type synchronization notification.

17. An apparatus, comprising:

a co-processor graphic data consumer; and a co-processor graphic data producer, wherein the co-processor graphic data producer is configured to communicate with co-processor graphic data consumer via a direct link, wherein the direct link comprises a first direct link between a video decoder as the co-processor graphic data producer and a 3D engine module as the co-processor graphic data consumer, and a separate second direct link between the 3D engine module as the co-processor graphic data producer and a display controller as the co-processor graphic data consumer, wherein the co-processor graphic data producer is configured to:

receive an initial data message from a central processing unit;

receive an interrupt-type synchronization notification associated with the co-processor graphic data consumer; and transfer image data associated with the initial data message to a buffer in response to the interrupt-type synchronization notification, wherein the co-processor graphic data producer receives the interrupt-type synchronization notification from the co-processor graphic data consumer via the direct link without passing such communications through the central processing unit.

18. The apparatus of claim 17, wherein the co-processor graphic data producer is further configured to:

generate the image data associated with the initial data message in response to the initial data message;

communicate a data generated-type synchronization notification to the co-processor graphic data consumer in response to the image data having been generated;

communicate a data transferred-type synchronization notification to the co-processor graphic data consumer in response to the transfer of the image data having ceased; and communicate a location notification to the co-processor graphic data consumer in response to the transfer of the image data having been ceased, wherein the location notification indicates the buffer location where the image data has been transferred to.

19. The apparatus of claim 17, wherein the co-processor graphic data producer is further configured to communicate a data transferred-type synchronization notification to the co-processor graphic data consumer in response to the transfer of the image data having ceased, and wherein the co-processor graphic data consumer is further configured to scan the image data from the buffer in response to the data transferred-type synchronization notification.

20. The apparatus of claim 19, wherein the co-processor graphic data producer receives the initial data message from the central processing unit via a direct memory access-type data transmission (DMA) or a memory mapping-type data transmission, wherein the central processing unit, the co-processor graphic data producer, and the co-processor graphic data consumer all form part of a system-on-chip (SoC) processor, wherein the co-processor graphic data producer comprises a 2D accelerator module;

wherein the co-processor graphic data consumer comprises a wireless display (WiDi) module, and and wherein the buffer comprises one or more of the following buffer types: a frame buffer, a render buffer, a front buffer, and/or a back buffer.

21. A system comprising:

a display;

a central processing unit;

a buffer;

a co-processor graphic data consumer, wherein the a co-processor graphic data consumer is configured to transfer image data to the display; and a co-processor graphic data producer, wherein the co-processor graphic data producer is communicatively coupled to the buffer and the central processing unit, wherein the co-processor graphic data producer is configured to communicate with co-processor graphic data consumer via a direct link, wherein the direct link comprises a first direct link between a video decoder as the co-processor graphic data producer and a 3D engine module as the co-processor graphic data consumer, and a separate second direct link between the 3D engine module as the co-processor graphic data producer and a display controller as the co-processor graphic data consumer, wherein the co-processor graphic data producer is configured to:

receive an initial data message from the central processing unit;

receive an interrupt-type synchronization notification associated with the co-processor graphic data consumer; and transfer image data associated with the initial data message to the buffer in response to the interrupt-type synchronization notification, wherein the co-processor graphic data producer receives the interrupt-type synchronization notification from the co-processor graphic data consumer via the direct link without passing such communications through the central processing unit.

22. The system of claim 21, wherein the co-processor graphic data producer is further configured to:

generate the image data associated with the initial data message in response to the initial data message;

communicate a data generated-type synchronization notification to the co-processor graphic data consumer in response to the image data having been generated;

communicate a data transferred-type synchronization notification to the co-processor graphic data consumer in response to the transfer of the image data having ceased; and communicate a location notification to the co-processor graphic data consumer in response to the transfer of the image data having been ceased, wherein the location notification indicates the buffer location where the image data has been transferred to.

23. The system of claim 21, wherein the co-processor graphic data producer is further configured to communicate a data transferred-type synchronization notification to the co-processor graphic data consumer in response to the transfer of the image data having ceased, and wherein the co-processor graphic data consumer is further configured to scan the image data from the buffer in response to the data transferred-type synchronization notification.

24. The system of claim 21, wherein the direct link comprises direct wire connections between the co-processor graphic data producer and the co-processor graphic data consumer.

25. The system of claim 21, wherein the direct link comprises routes in a network-on-chip (NoC) between the co-processor graphic data producer and the co-processor graphic data consumer.

26. The system of claim 21, wherein the co-processor graphic data producer receives the initial data message from the central processing unit via a direct memory access-type data transmission (DMA) or a memory mapping-type data transmission, wherein the central processing unit, the co-processor graphic data producer, and the co-processor graphic data consumer all form part of a system-on-chip (SoC) processor, wherein the co-processor graphic data producer comprises a 2D accelerator module, wherein the co-processor graphic data consumer comprises a wireless display (WiDi) module, and and wherein the buffer comprises one or more of the following buffer types: a frame buffer, a render buffer, a front buffer, and/or a back buffer.

* * * * *